United States Patent [19]

Kiriyama et al.

[11] Patent Number: 5,136,448
[45] Date of Patent: Aug. 4, 1992

[54] TAPE CLEANING APPARATUS HAVING A CLEANING BLADE CONTACTED WITH THE TAPE ONLY WHEN THE ASSOCIATED TAPE RECORDING AND/OR REPRODUCING APPARATUS DRIVES THE TAPE AT A NORMAL SPEED

[75] Inventors: Hiroshi Kiriyama; Shigeru Masuda, both of Kanagawa, Japan

[73] Assignee: Sony Corporation, Tokyo, Japan

[21] Appl. No.: 633,257

[22] Filed: Dec. 21, 1990

[30] Foreign Application Priority Data

Dec. 28, 1989 [JP] Japan .................. 1-342709

[51] Int. Cl.$^5$ .............. G11B 5/10; G11B 5/127; G11B 5/41
[52] U.S. Cl. ...................... 360/128; 360/71; 360/132; 360/85; 360/130.31
[58] Field of Search .............. 360/132, 128, 137, 71, 360/90, 95, 93, 130.3, 130.31; 15/DIG. 12, DIG. 13

[56] References Cited

U.S. PATENT DOCUMENTS

| | | | |
|---|---|---|---|
| 3,642,536 | 2/1972 | Robak | 360/128 |
| 4,498,115 | 2/1985 | Hofmann | 360/132 |
| 5,045,962 | 9/1991 | Inoue et al. | 360/128 |
| 5,047,887 | 9/1991 | Boshek | 360/85 |

OTHER PUBLICATIONS

IBM Tech. Discl. Bull., vol. 11, No. 9, Feb. 1969, pp. 1183 "Cleaning Magnetic tape", by K. R. Grebe.
IBM Tech. Discl. Bull., vol. 3, No. 10, Mar. 61, p. 14 "Magnetic Tape Cleaner", by P. J. Badum.

*Primary Examiner*—Aristotelis Psitos
*Assistant Examiner*—Alfonso Garcia
*Attorney, Agent, or Firm*—Alvin Sinderbrand; William S. Frommer

[57] ABSTRACT

A tape cleaning apparatus for a tape recording and/or reproducing apparatus prevents possible dropping of recording or a possible dropout during recording and/or reproducing operation of a tape while the tape is fed at a low speed and can protect the tape when the tape is fed at a high speed to effect fast feeding or rewinding thereof. The tape cleaning apparatus comprises a blade made of an abrasion resistant material and located on the upstream side of a recording and/or reproducing section of the tape recording and/or reproducing apparatus in a direction in which the tape is fed at the low speed. The tape cleaning apparatus also includes a controller for controlling the blade to assume a first position at which the blade contacts with the tape to remove foreign substance sticking to the tape when the tape is fed at the low speed but to assume a second position at which the blade is spaced apart from the tape when the tape is driven at a high speed.

5 Claims, 6 Drawing Sheets

TAPE CLEANING APPARATUS HAVING A CLEANING BLADE CONTACTED WITH THE TAPE ONLY WHEN THE ASSOCIATED TAPE RECORDING AND/OR REPRODUCING APPARATUS DRIVES THE TAPE AT A NORMAL SPEED

BACKGROUND OF THE INVENTION

1. Field of the Invention

This invention relates to a tape cleaning apparatus for removing foreign matter stuck to a record face of a tape for use in a tape recording and/or reproducing apparatus such as a digital video cassette tape recorder.

2. Description of the Prior Art

As is well known, a metal tape is conventionally used in a digital video cassette tape recorder. In order to record or reproduce a metal tape, it is first drawn out of a tape cassette and loaded in position around a rotary head drum which serves as a recording and/or reproducing section of a digital video tape recorder. The tape is then fed at a low speed to record or reproduce signals on the metal tape by means of a rotary head or heads on the rotary head drum. However, when the metal tape is to be fed fast or rewound, it is driven at high speed.

A metal tape is disadvantageous in that magnetic powder is more likely to come off its magnetic recording face and dust or other foreign articles are more likely to stick to the magnetic face. If such magnetic powder, dust or other foreign particles stick to a rotary head of the rotary head drum and come into or pass through a head gap of the rotary head, dropping of recording or dropout during reproduction may take place. If the foreign particles accumulate in the head gap, head clogging will take place.

OBJECTS AND SUMMARY OF THE INVENTION

It is an object of the present invention to provide a tape cleaner for a tape recording and/or reproducing apparatus which can prevent possible dropping of recording or dropout during reproduction caused by foreign particles sticking to the record face of a tape and which is also effective to protect the tape.

In accordance with an aspect of this invention, a tape cleaning apparatus for use with a tape recording and/or reproducing apparatus which has a first mode in which a tape from a tape cassette removably loaded in position is fed at a first speed while transducer means record and/or reproduce signals on the tape and a second mode in which the tape is fed at a second speed higher than the first speed comprises a blade of an abrasion resisting material located at the upstream side of the transducer means in a first direction in which the tape is fed at the first speed, control means responsive to the speed of which the tape is being fed for controlling the blade means to cause it to assume a first position at which the blade contacts with the tape to remove foreign substance sticking to the tape when the tape is fed at the first speed but to assume a second position at which the blade is spaced apart from the tape when the tape is fed at the second speed.

With the tape cleaning apparatus embodying the present invention, when a tape is fed at the first or low speed to effect recording and/or reproduction thereof, the blade is contacted with the tape on the upstream side of the transducer means in the first tape feeding direction to remove foreign substance sticking to the tape. Consequently, such foreign substance can be prevented effectively from sticking to the transducer means, thus preventing possible dropping of recording or dropout during reproduction as well as possible head clogging which may be caused by such foreign substance. On the other hand, when the tape is fed at the second or high speed to effect fast feeding or rewinding thereof, the blade is spaced apart from the tape to protect the tape from being abraded or damaged by the blade. In this manner, the tape can be protected with certainty and the life of the tape can be increased.

The above and other objects features and advantages of the present invention will become apparent from the following description and the appended claims, taken in conjunction with the accompanying drawings.

DETAILED DESCRIPTION OF THE PREFERRED EMBODIMENT

Figure 6:
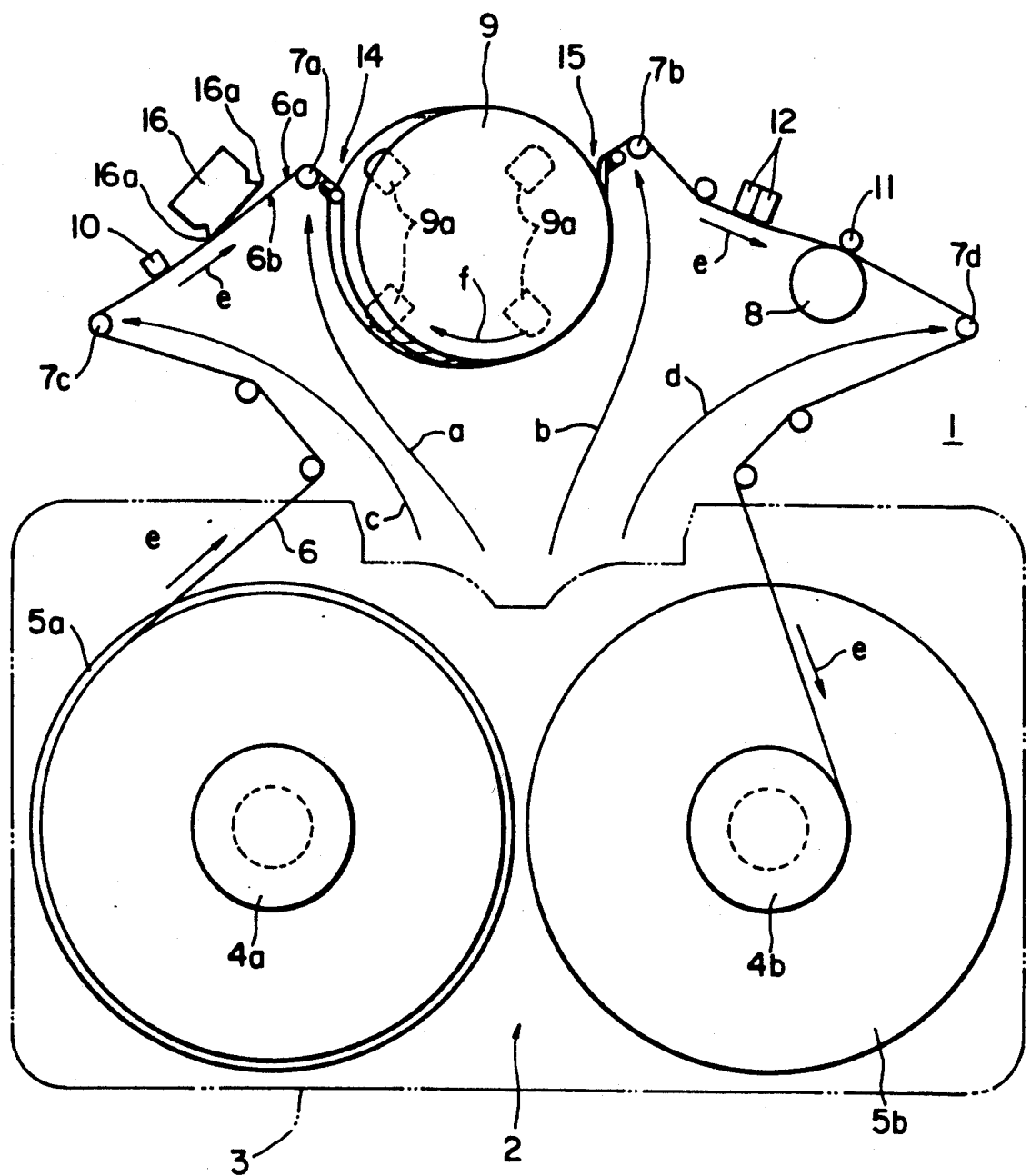
FIG. 6 is a schematic plan view showing an entire tape feeding system including a tape cleaner in accordance with the present invention.

Referring first to FIG. 6, there is shown an outline of an entire tape feeding system of a digital video cassette tape recorder in which a tape cleaner according to the present invention is incorporated.

When a tape cassette 3 is loaded horizontally in a cassette receiving location 2 on a chassis 1 from above by means of a cassette loading device, a supply reel 5a and a takeup reel 5b in the cassette 3 are received on a supply reel receiver 4a and a takeup reel receiver 4b, respectively, located at the cassette receiving location 2. Further, upon loading of the cassette 3, a plurality of loading guides 7a, 7b, 7c and 7d and a pinch roller 8 at respective home positions are relatively inserted from below into the cassette 3 at the inner side of a metal tape (magnetic tape) 6 which is wound on and extends between the reels 5a and 5b in the cassette 3.

Then, when such loading of the cassette 3 is detected by a sensor, the loading guides 7a, 7b, 7c and 7d are moved forwardly from their home positions to respective operative positions in front of the cassette 3 as indicated by arrows a, b, c and d. At the same time, the pinch roller 8 is moved forwardly from the home position to an operative position shown in FIG. 6. Thereupon, the metal tape 6 in the cassette 3 is drawn out to a tape feeding path outside the cassette 3 by the loading guides 7a, 7b, 7c and 7d so that it is loaded helically in position on a circumferential surface of rotary head drum 9 serving as a recording and/or reproducing section by the pair of loading guides 7a and 7b. Simultaneously, the loading guide 7c displaces a supply side portion of the metal tape 6 into contact with a full width erasing head 10 while the other loading guide 7d loads a takeup side portion of the metal tape 6 into contact with a capstan 11, and with a combination head 12 including a sound recording and/or reproducing head and control head, and so forth.

When the digital video tape recorder is changed over to a recording or reproducing mode after such tape loading, pinch roller 8 is urged to press the metal tape 6 against the capstan 11 and then at the same time takeup reel 5b is rotatably driven to feed the metal tape 6 at a low speed in the direction indicated by arrows e so that is may be taken up from the supply reel 5a to the takeup reel 5b while a recording and/or reproducing operation is performed on the metal tape 6 by means of a plurality of rotary heads 9a of the rotary head drum 9 rotating at high speed in the direction indicated by an arrow f. During such recording and/or reproducing operation, the tension of metal tape 6 is automatically controlled so that it normally remains constant.

When the digital video tape recorder is changed over to a fast forwarding mode or a rewinding mode, pinch roller 8 is spaced apart from the capstan 11. In this condition, either the takeup reel 5b or the supply reel 5a is rotatably driven at high speed to feed the metal tape 6 at a high speed along the tape feeding path so that it may be taken up by the takeup reel 5b or the supply reel 5a. It is to be noted that the tension of the metal tape 6 is decreased during such fast feeding or rewinding operation.

With the arrangement described above, the loading guides 7a and 7b disposed adjacent a tape entrance 14 and a tape exit 15 with respect to the rotary head drum 9 contact with and guide a rear face 6b of the metal tape 6 opposite to a record face 6a of the magnetic tape.

A blade 16, which will be later described in detail, is disposed between the full width erasing head 10 and the loading guide 7a which is positioned adjacent the tape entrance 14 at the upstream side of the rotary head drum 9 considered in respect to the direction in which the metal tape 6 is fed, that is, in the direction indicated by the arrows e.

When the recording and/or reproducing operation of the metal tape 6 is performed while it is fed at a low speed as described above, the blade 16 contacts the record face 6a of the metal tape 6 at the upstream side of the rotary head drum 9 considered in respect to the feeding direction of the metal tape 6 to remove foreign particles, such as magnetic powder or dust, which may stick to the record face 6a. This also prevents those foreign articles from subsequently sticking to the rotary heads 9a of the rotary head drum 9.

In this manner, the possibility that foreign particles sticking to the record face 6a of the metal tape 6 may enter into, or pass through a head gap of a rotary head 9a and thereby cause dropping of recording, dropout upon reproduction, or filling of the head gap of a rotary head 9a to cause head clogging is reliably prevented.

It is to be noted that, when the metal tape 6 is to be fed at a high speed to perform fast feeding or rewinding thereof, the blade 16 is spaced apart from the record face 6a of the metal tape 6 in order to prevent the record face 6a from being abraded and damaged by the blade 16 and thereby reliably protect the metal tape 6 and assure a long life of the metal tape.

Figure 2A:
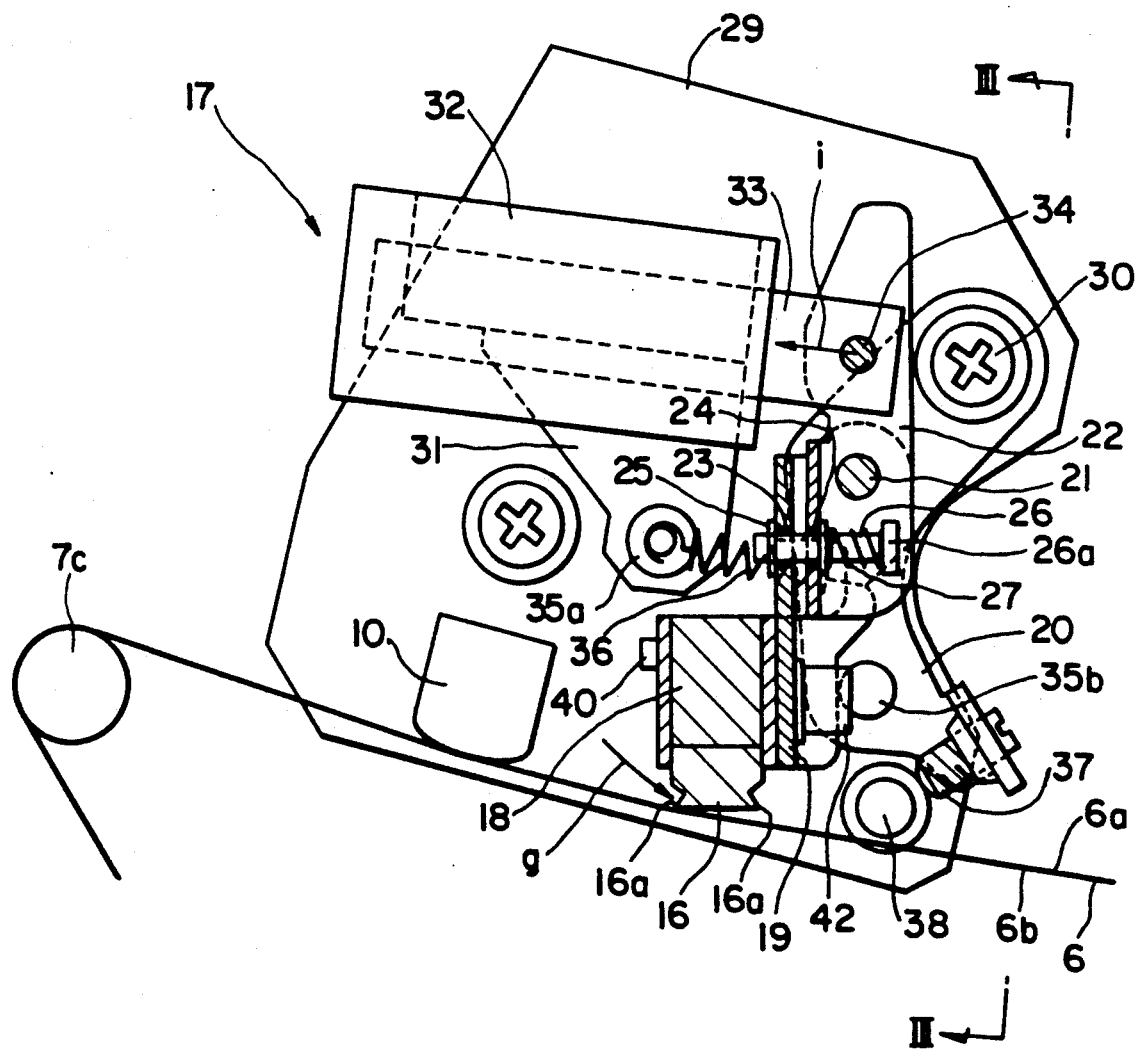
FIGS. 2A and 2B are plan views of a moving mechanism of the tape cleaner at different positions.
Figure 2B:
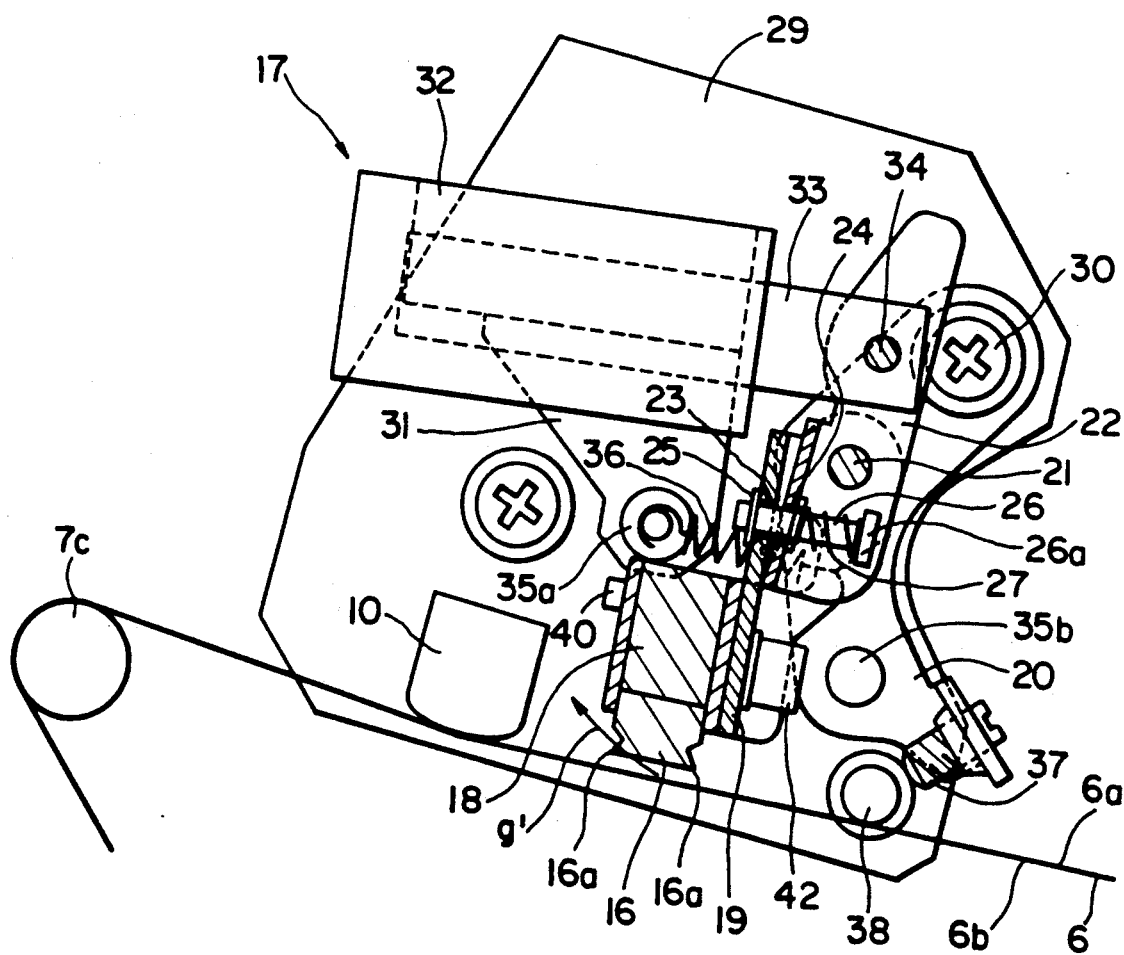
Figure 3:
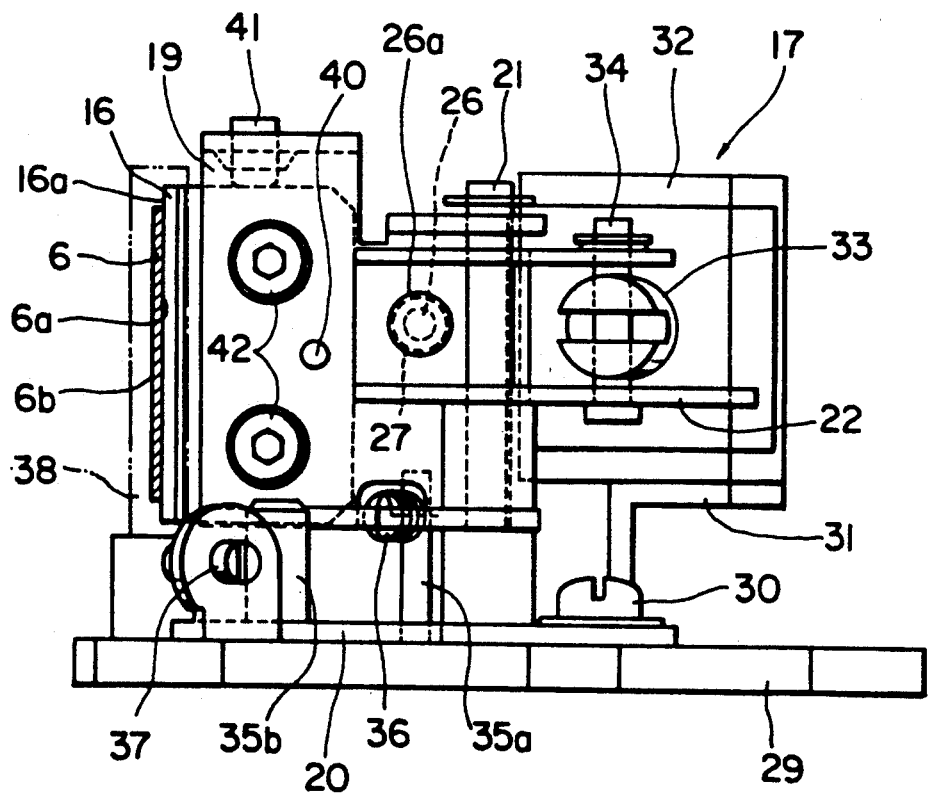
FIG. 3 is a side elevational view of the moving mechanism depicted in FIG. 2A as viewed in the direction indicated by arrows III—III in FIG. 2A.

Referring now to FIGS. 2A, 2B and 3, there is shown a moving mechanism 17 for moving the blade 16 into and out of contact with the record face 6a of the metal tape 6. The blade 16 is made of a non-magnetic abrasion resisting material such as ruby, sapphire or a ceramic and has a pair of sharp edges 16a formed on the opposite sides of an end thereof. The blade is mounted on a pivotal lever 19 by way of a holder 18 securely mounted on a back face of the blade 16 by suitable means such as press fitting. The two sharp edges 16a on the opposite sides of the end of the blade 16 are provided so that the blade 16 can be reversed or mounted in the opposite orientation on the pivotal lever 19 to alternately use the sharp edges 16a. Thus, the blade 16 must have at least one such sharp edge 16a.

The pivotal lever 19 has a substantially channel-shaped cross section and is mounted for reciprocal pivotal motion in the directions indicated by arrows g and g' in FIGS. 2A and 2B around a pivot shaft 21 securely mounted vertically on a base plate 20. A limiter lever 22 having a substantially channel-shaped cross section is also mounted for pivotal motion in the directions indicated by the arrows g and g' around the pivot shaft 21 in an overlapping relationship to the inner side of the pivotal lever 19. A pin 26 extends through throughholes 23 and 24 formed in the pivotal lever 19 and limiter lever 22, respectively. The pin 26 is retained at an end thereof in respect to the pivotal lever 19 by a retention ring 25 secured to the pin 26 and by a flange 26a formed at its other end. A limiter spring 27 in the form of a compression coil spring is fitted around the pin 26 between the flange 26a of the pin 26 and the limiter lever 22.

Figure 5:
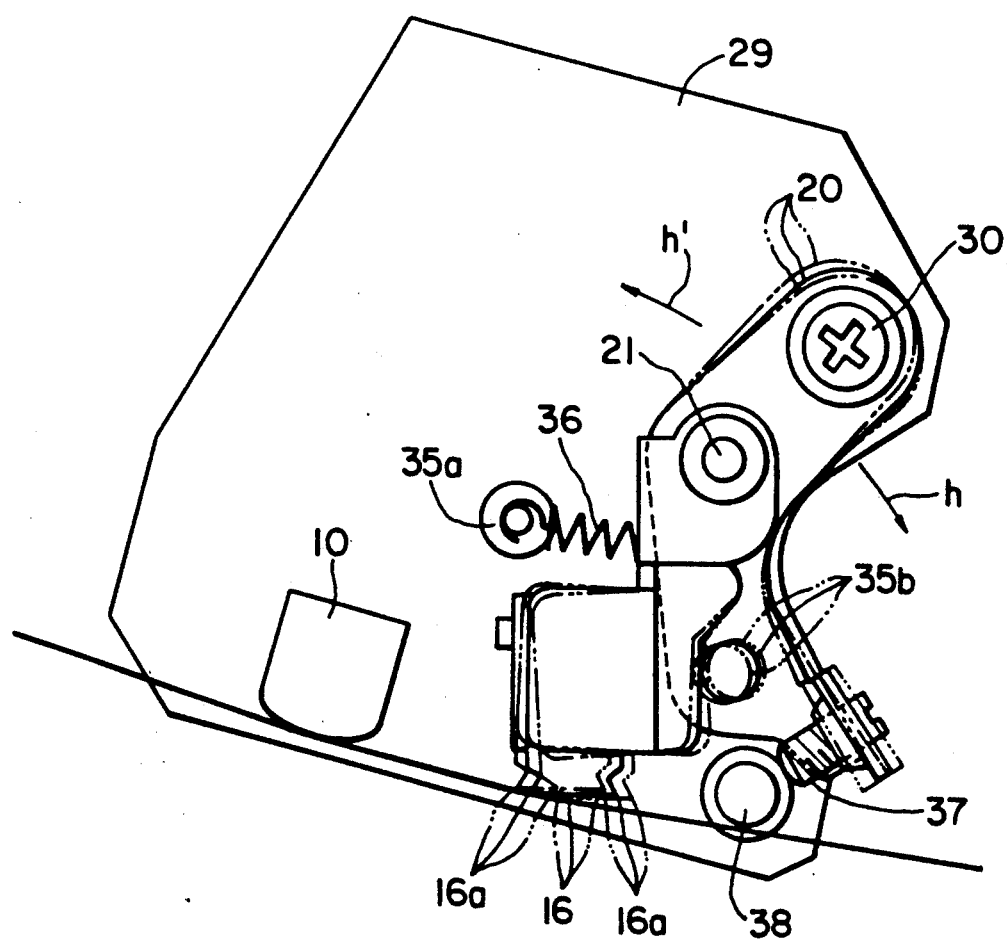
FIG. 5 is a plan view illustrating adjustment of the amount of projection of the blade of FIG. 1.

Referring to FIG. 5, the base plate 20 is mounted for reciprocal pivotal motion in the directions indicated by arrows h and h' around a pivot shaft 30 on a sub chassis 29 securely mounted on the chassis 1. The pivot shaft 30 also serves as a fastening screw for fastening the sub chassis 29 to the chassis 1. Referring back to FIGS. 2A, 2B and 3, a plunger 33 of a plunger solenoid 32 is shown to be connected to the limiter lever 22 by means of a pin 34. The plunger solenoid 32 is mounted on the sub chassis 29 by means of a mounting base 31 and serves as a driving means. A return spring 36 in the form of a tension coil spring extends between the pivotal lever 19 and a stopper 35 provided on the mounting base 31 to normally urge the pivotal lever 19 and base plate 20 to pivot in the directions g' and h' around the pivot shafts 21 and 30, respectively. It is to be noted that an adjusting screw 37 mounted at an end of the base plate 20 bears against a base portion of a tape guide 38 securely mounted vertically on the sub chassis 29. Another stopper 35b for the pivotal lever 19 is mounted on the base plate 20 and the full width erasing head 10 is mounted on the sub chassis 29.

Figure 4:
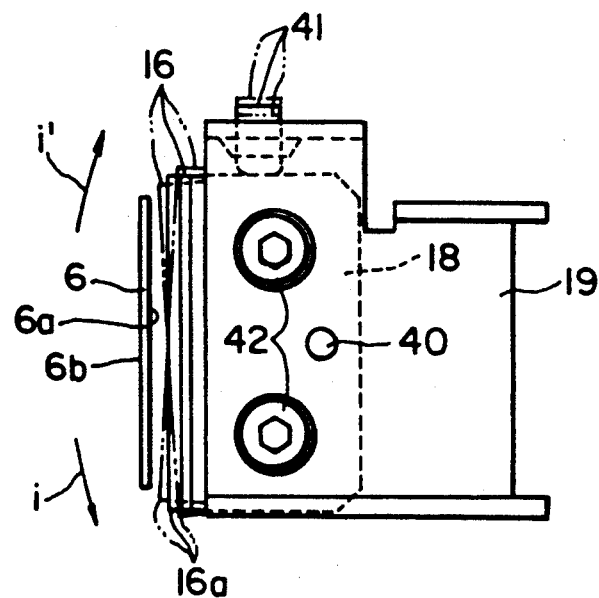
FIG. 4 is a side elevational view illustrating azimuth adjustment of the blade of FIG. 1.

The holder 18 for the blade 16 is mounted for reciprocal pivotal motion on a side face of an end of the pivotal lever 19 by means of a pivot shaft 40 and can pivot in the directions indicated by the arrows i and i' in FIG. 4. An adjusting screw 41 is mounted at an upper portion of the end of the pivotal lever 19 and a pair of locking screws 42 are mounted on a side face of the pivotal lever 19 remote from the holder 18.

With the moving mechanism 17 described above, when the digital video tape recorder is changed over to a recording and/or reproducing mode, the plunger solenoid 32 is energized to attract the plunger 33 and thereby move the latter in the direction indicated by the arrow j as seen in FIG. 2A. The limiter lever 22 then pivots in the direction of the arrow g around the pivot shaft 21. The limiter spring 27 then permits the pivotal lever 19 to pivot in the direction of the arrow g around the pivot shaft 21 under the urging of the return spring 36 until one of the sharp edges 16a of the blade 16 contacts the record face 6a of the metal tape 6. Then, the pivotal lever 19 contacts and is positioned by the stopper 35b.

When the digital video tape recorder is changed over from a recording and/or reproducing mode to a fast feeding mode or a rewinding mode, the plunger solenoid 32 is deenergized. The pivotal lever 19 and limiter lever 22 are then pivoted back in the direction of the arrow g' around the pivot shaft 21 by the return spring 36 so that the blade 16 is spaced apart from the record face 6a of the metal tape 6 until the pivotal lever 19 contacts and is stopped by the stopper 35a as seen in FIG. 2B.

It is to be noted that, when the digital video tape recorder is changed over from a recording and/or reproducing mode to a stopping mode, the blade 16 is similarly spaced apart from the metal tape 6.

If the adjusting screw 41 is adjusted as seen in FIG. 4, while the locking screws 42 are both in a loosened condition, the blade 16 will pivot in the direction indicated by the arrow i or i' around the pivot shaft 40. Thus, adjustment of the parallelism of the sharp edges 16a of the blade 16 to the metal tape 6, that is, so-called azimuth adjustment, can be performed by adjustment of the adjusting screw 41.

If the adjusting screw 37 is adjusted as seen in FIG. 5, while the fastening screw which serves also as the pivot shaft 30 is in a loosened condition, then it pivots the base plate 20 in cooperation with the return spring 36 in the direction indicated by the arrow h or h' around the pivot shaft 30. Thus, adjustment of the amount of projection of the sharp edge 16a of the blade 16 with respect to the metal tape 6 can be performed by such adjustment of the adjusting screw 37.

Figure 1:
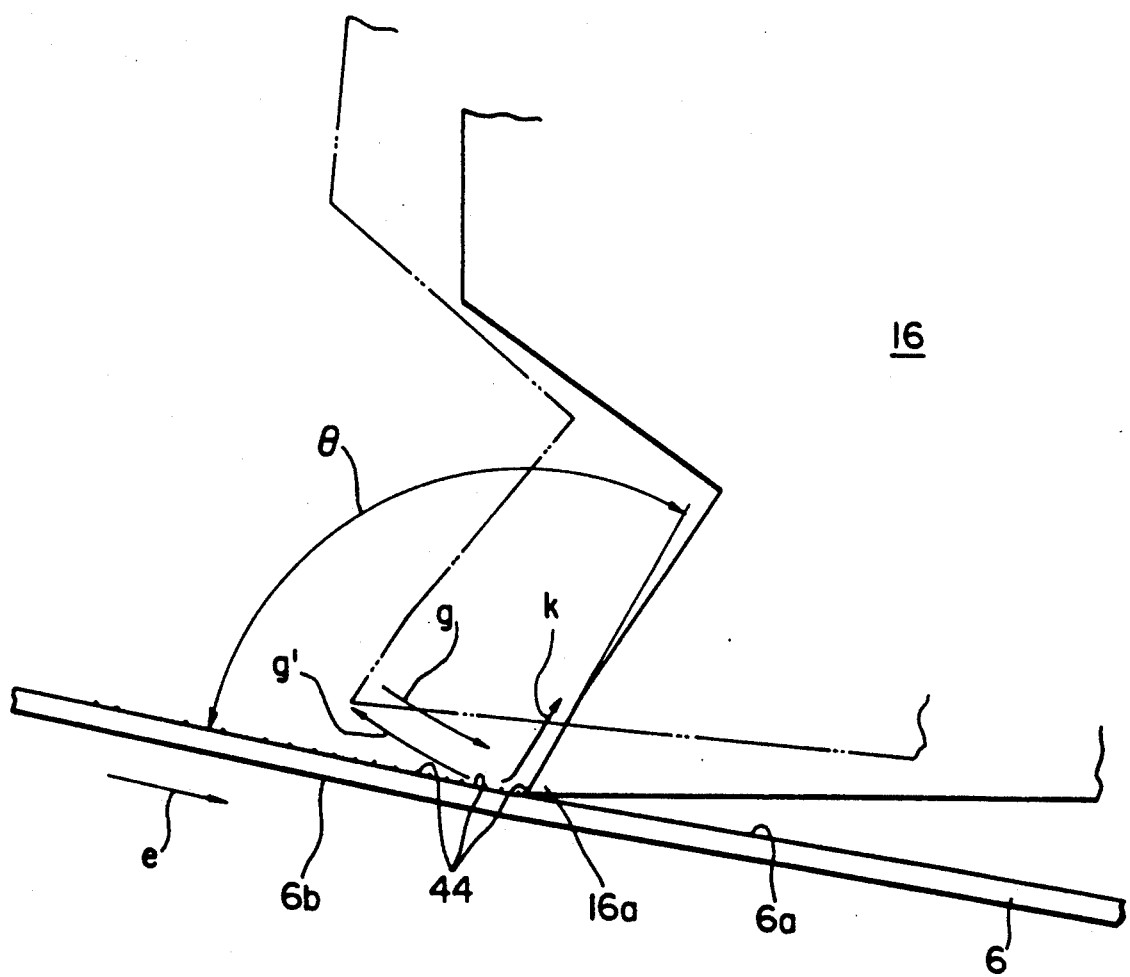
FIG. 1 is an enlarged view of a sharp edge portion of a blade of a tape cleaner in accordance with a preferred embodiment of the present invention.

Referring now to FIG. 1, there is shown a portion of a sharp edge 16a of the blade 16 in an enlarged scale. The sharp edge 16a shown by solid lines contacts the record face 6a of the metal tape 6 at a rake angle Θ of about 110 degrees or so with the record face 6a of the metal tape 6 to positively scoop foreign particles 44, such as magnetic powder or dust sticking to the record face of the metal tape 6, while it is fed at a low speed in the direction indicated by the arrow e. The sharp edge 16a thus prevents the scooped foreign articles 44 from remaining on the metal tape 6.

When the blade 16 is pivoted in the direction of the arrow g from an inoperative position indicated by an alternate long and short dash line to an operative position indicated by a solid line, the sharp edge 16a softly contacts the metal tape 6.

When the blade 16 is pivoted reversely in the direction of the arrow g', from the operative position to the inoperative position it spaces the sharp edge 16a apart from the metal tape 6.

A test was conducted with several digital video tape recorders on a 90 minute tape. This test revealed that, where blade 16 was not employed, an average quantity of foreign particles sticking to a metal tape and entering the rotary head drum 9 was 8.1 per the length of tape required for 90 minutes of recording or reproducing. However, where the blade 16 was employed, the average quantity of foreign particles was 0.3 per the length for 90 minutes. In the latter case, however, the average quantity could have been considered equal to 0 if defects of the tape were ignored.

It is to be noted that a tape cleaner for a tape recording and/or reproducing apparatus according to the present invention can be incorporated not only in a digital video tape recorder but also in a digital audio tape recorder. It may also be employed in various other types of recording and/or reproducing apparatus, such as ordinary video tape recorders.

Having now fully described an embodiment of the invention, it will be apparent to one of ordinary skill in the art that many changes and modifications can be made thereto without departing from the spirit and scope of the invention as set forth herein.

What is claimed is:

1. A tape cleaning apparatus for use with a tape recording and/or reproducing apparatus which has a first mode in which a tape from a tape cassette removably loaded in position is fed at a first speed while transducer means records and/or reproduces signals on the tape and a second mode in which the tape is driven at a second speed higher than the first speed, comprising:
   a blade member made of an abrasion resisting material and located at an upstream side of said transducer means with respect to a direction in which the tape is fed at the first speed; and
   control means for controlling said blade member to assume a first position at which said blade member contacts the tape to remove foreign substance sticking to the tape when the tape is fed at the first speed but to assume a second position at which said blade member is spaced apart from the tape when the tape is driven at the second speed.

2. A tape cleaning apparatus according to claim 1, wherein said blade member has first and second sharp edge portions on opposite sides thereof.

3. A tape cleaning apparatus according to claim 1, wherein said blade member has at least one sharp edge portion, and is secured on holder means.

4. A tape cleaning apparatus according to claim 3, wherein said blade member is of a non-magnetic material.

5. A tape cleaning apparatus according to claim 4, wherein said control means includes a pivotal lever member having said holder means mounted thereon, and plunger means for actuating said pivotal lever member upon changing between the first and second modes of said tape recording and/or reproducing apparatus.

* * * * *